Figure 1:
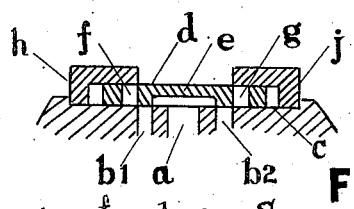
Figure 2:
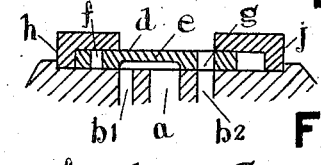

Apr. 24, 1923.

A. H. TWELLS 1,453,029

VALVE GEAR OF DUPLEX PUMPS

Filed Aug. 20, 1919

2 Sheets-Sheet 1

Witnesses.
Frank Ruddock.
Lydia Mary Twells.

Inventor.
Arthur Hughes Twells

Apr. 24, 1923.

A. H. TWELLS 1,453,029

VALVE GEAR OF DUPLEX PUMPS

Filed Aug. 20, 1919   2 Sheets-Sheet 2

Witnesses.
Frank Ruddock
Lydia Mary Twells.

Inventor.
Arthur Hughes Twells.

Patented Apr. 24, 1923.

1,453,029

UNITED STATES PATENT OFFICE.

ARTHUR HUGHES TWELLS, OF LEICESTER, ENGLAND.

VALVE GEAR OF DUPLEX PUMPS.

Application filed August 20, 1919. Serial No. 318,697.

*To all whom it may concern:*

Be it known that I, ARTHUR HUGHES TWELLS, a subject of the King of Great Britain and Ireland, residing at 213 Melton Road, in the township of Leicester, in the county of Leicestershire and Kingdom of England, have invented a new and useful Improvement in Valve Gears of Duplex Pumps, of which the following is a specification; and I do declare the following to be a full, clear, and exact description of the invention, such as will enable others skilled in the art to which it appertains to make and use the same.

The object of my invention is to provide means for obtaining expansion of steam or other gases in the cylinders of duplex pumps, having the valve gear for which a U. S. Patent No. 1296234, 1919, has been granted to me.

I propose to use a cut-off valve working in connection with the slide valve, which controls the steam or other gas to and from the cylinder of each unit.

To do this I provide the slide valve with an additional face preferably parallel with the ordinary slide valve face on the cylinder, and the slide valve would also be provided with ports forming the steam inlets. On the additional face a cut-off valve or valves would be mounted to cut off the steam supply to each end of the cylinder, this cut-off valve could be actuated by the slide valve, a certain amount of free movement being permitted between the slide valve and the cut-off valve and means provided for preventing the movement of the cut-off valve during the free movement of the slide valve. The cut-off valve might alternately be actuated by the valve spindle engaging with the cut-off valve inside the steam chest or the cut-off valve might be provided with its own valve spindle carried through a separate stuffing box on the steam chest and actuated from the main valve spindle by tappets or the like, and means could be provided for regulating and varying the cut-off by this method the cut-off would be regulated automatically by the speed of the pump, I propose to actuate the cut-off valve from the movable fulcrum upon which the actuating lever of the slide valve is mounted, or from a connection on actuating lever or alternatively from the main lever of the pump, in each case a suitable reduction gear would be provided to reduce the amount of movement to that required by the cut-off valve, and means could be provided by which the point of cut-off could be determined and altered as required, such means might be conveniently attached to the before mentioned levers or to the reduction gear.

The method of obtaining the required cut-off would be modified to suit piston valves or Corliss valves. I will now describe my invention with the assistance of the accompanying four sheets of drawings in which:—

Figs. 1 to 10 shew sectional views of slide and cut-off valves in different working positions.

Figure 11:
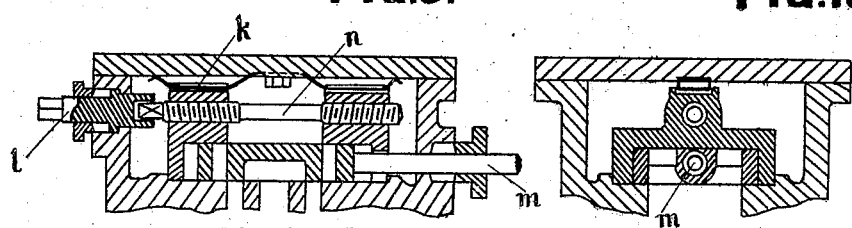

Fig. 11,—a longitudinal section through steam chest, slide valve and cut-off valve.

Figure 12:
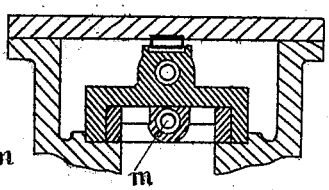

Fig. 12,—is a cross section through steam chest and valves, at section line $x$—$y$ in Fig. 11.

Figure 13:
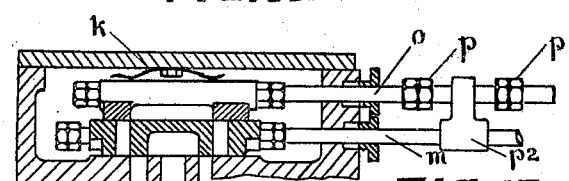

Fig. 13,—shews cut-off valve with independent valve spindle and regulating gear.

Figure 14:
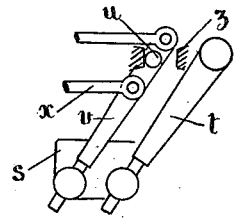

Fig. 14,—shews alternative connection to actuating lever.

Figure 15:
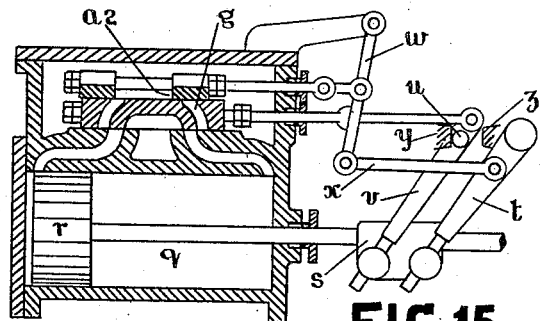
Figure 16:
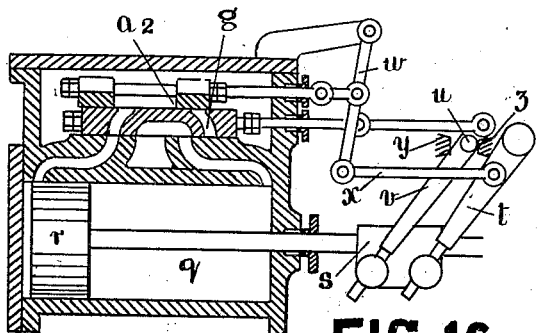
Figure 17:
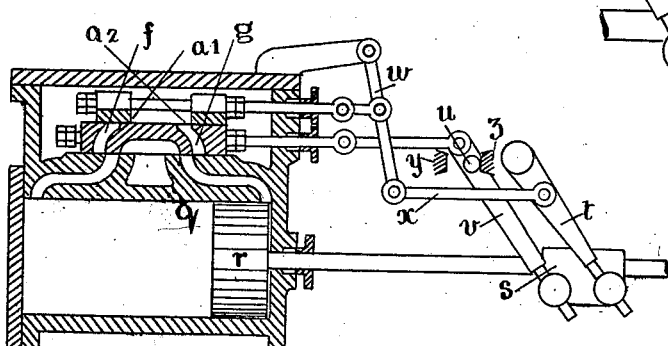

Figs. 15, 16, and 17,—shew sections through steam cylinder, slide and cut-off valves, and the arrangement of gear actuated by the main pump lever, which operates the movable fulcrum of the opposite pump.

Figure 18:
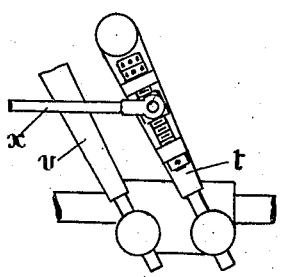

Fig. 18,—shews a method of obtaining variable cut-off by gear fixed to main pump lever.

In Fig. 1, "$a$" is the exhaust port, "$b^1$" and "$b^2$", the main steam ports, "$c$" the cylinder face, "$d$" the additional slide valve face, "$e$" the main slide valve, "$f$" and "$g$", the steam ports through the main slide valve, "$h$" and "$j$", the cut-off valves.

In Figs. 1 to 10,—similar letters refer to similar parts.

Figure 3:
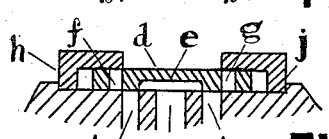
Figure 4:
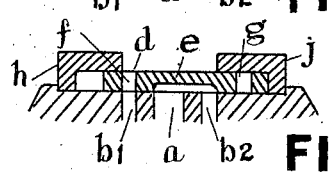
Figure 5:
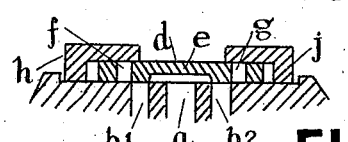
Figure 6:
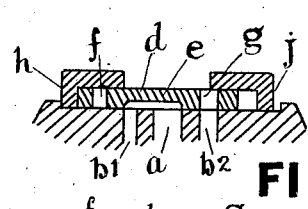
Figure 7:
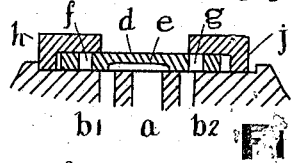
Figure 8:
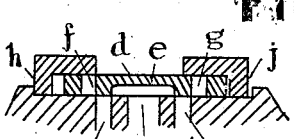
Figure 9:
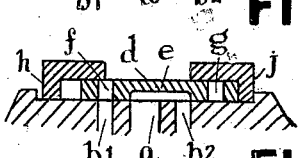
Figure 10:
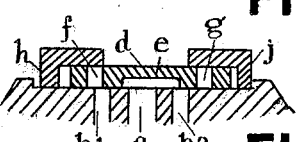

In Fig. 1, the cut-off valves "$h$" and "$j$" are shewn in their extreme position so that they do not cause any cut-off which is done by the main slide valve only, at the end of the stroke. The slide valve "$e$", is shewn in mid position, steam being cut off from both ends of the cylinder. In Fig. "2", the slide valve has been moved to the left, opening the left-hand end of the steam cylinder to the exhaust, and the right-hand end to steam. In Fig. 3,—the slide valve has been brought back to mid-position, the piston having reached the end of its stroke, and the slide valve has cut off steam to port "$b^2$." In Fig. 4, the opposite pump has moved the slide valve to the extreme right, the left hand end of the cylinder being now open to steam and the right hand to exhaust. In Fig. 5,—the movement of the pump crosshead and the valve actuating lever has brought the slide valve "e," once more to mid-position. At this point by means of the adjusting gear "l," shewn in Fig. 11, the cut-off valves "h" and "j" are brought nearer together. In Fig. "6,"—the slide valve has come into contact with the cut-off valve "h," and has moved it to its extreme left position and as the expansion valves "h" and "j" are connected together, the cut-off valve "j" has also been moved to the left, so that its cutting off edge projects over the right hand edge of the steam port "g." In Fig. 7 the slide valve moves toward mid-position but before reaching it, and therefore before the piston reaches the end of its stroke, the steam to the right hand end of the cylinder is cut off by the edge of the cut-off valve "j" meeting the left hand edge of the port "g" of the slide valve, the rest of the stroke of the piston being performed by the expansion of the steam in the cylinder. Fig. 8 shews the position of the slide valve when the piston reaches the end of its stroke, from which it will be seen that though the steam has been cut off early the port "b¹," has only just closed to exhaust, while the slide valve is ready to admit live steam through the ports "f" and "b¹" to the left hand end of the cylinder. Fig. 9 shews the position of the cut-off valve after the movement of the slide valve to the right moving the cut-off valve "j," and therefore the cut-off valve "h" also to the right. Fig. 10 shews the steam being cut off to the left hand end of the cylinder, but the port "b²" is still open to permit the escape of the exhaust steam from the right end of the cylinder. In Fig. 11 is shewn the adjusting gear for altering the cut-off a spindle "n" screwed with right and left hand thread engages with tapped holes in the cut-off valves; the end of the spindle next to the adjusting gear is square in section, and is slidable in a square socket forming the inside end of the adjustable spindle "l," which is provided with a collar, stuffing-box and gland, and the outer end of the spindle is squared to suit a spanner or handwheel. The turning of the adjusting screw varies the distance between the cut-off valves, without preventing free movement in a longitudinal direction. A spring "k," prevents the movement of the cut-off valves during the free movement of the slide valve. Fig. 12 is a cross section through steam chest and valves.

In Fig. 13 "m" is the main slide valve spindle and "O," the separate cut-off valve spindle, "p" shews adjustable tappets actuated by the projection "p²" on the main valve spindle. The cut-off valves in this arrangement can be in one piece, a spring "k" presses cut-off valve on to the face of the main slide valve.

Fig. 14 shews the method of connecting the cut-off valve gear when the latter is actuated by a connection on the actuating lever "V," this lever is mounted on the movable fulcrum "u," limited by fixed stops "y" and "z." s is the pump crosshead and "t" is the main pump lever actuating the movable fulcrum of the opposite pump. In Figs. 15, 16, and 17 "q" is the steam cylinder of one pump unit in section, "r" the piston, "s" the crosshead, "t" the main pump lever, "u" the movable fulcrum actuated by the main pump lever of the other unit, "v" is the valve actuating lever, "w" the lever actuating the cut-off valve, "x" the links connecting cut-off valve lever to fixed stud or adjustable pin on main lever of pump; the movement of the main pump lever "t" directly controlling the movement of the cut-off valve. In Fig. 15, the piston "r" is at the extreme left position, the slide valve is closed, it having been brought to the closed position by the lever "v" pivoting on the movable fulcrum "u" which is brought to bear against the fixed stop "y" when the pump moves from right to left.

The lever "t" has opened the valve of the opposite pump through its movable fulcrum and valve actuating lever, and the opposite pump near the termination of its stroke operates the movable fulcrum "u," moving it to the right as shewn in Fig. 16, and by means of the valve operating lever "v" mounted on the movable fulcrum, opening the slide valve "d," so that steam enters the left hand end of the cylinder, causing the piston "r" with levers "v" and "t" and "w" to move to the right where the parts will be as shewn in Fig. 17, where it will be seen that the main lever "t," through the link "x" and lever "w," has moved the cut-off valve from left to right, while the valve actuating lever "v," working on the movable fulcrum "u," which now bears on the right hand stop "z," has brought the main slide valve "e" to mid-position, but the cut-off valve has cut off the steam by the edge "a," traversing the port "f" in the slide valve as they pass each other in different directions. In the position shewn in Fig. 17, the main lever "t," has started the opposite pump which in its turn will move the movable fulcrum from the position therein shewn against stop "z," up to stop marked "y," and moving the slide valve so as to admit steam to the right hand end of the steam cylinder, the expansion valve however remaining in the position in which it is shewn in Fig. 17, until the piston begins to move, when the cut-off valve also begins to move from right to left by means of the lever "$t$," link "$x$," and lever "$w$," and cuts off the steam to the cylinder by sliding over the port "$q$" of the slide valve as the slide valve is brought back from left to right to mid-position by the valve actuating lever. Fig. 15 shews the slide valve brought back to mid-position, steam having been cut off by edge "$a^2$" of cut-off valve traversing port "$q$," of the slide valve as they pass each other in opposite directions.

Fig. 18, shews a simple method of varying the cut-off by altering the amount of movement of the cut-off valve, the end of the link "$x$" being adjustable as regards its distance from the fulcrum of lever "$t$," by a nut and screw adjusted by toggle nuts, or the like. When the end of the link is in the highest position or nearest to or coinciding with the fulcrum, there is no cut-off by the cut-off valve, the cut-off being performed by the slide valve only, at the end of the stroke of the piston.

What I claim is—

1. A duplex pump having in combination, a cylinder for each pump, a valve for each cylinder to control the admittance of an actuating fluid thereto, valve actuating levers actuated by the crosshead of each pump, movable fulcrums supporting said levers, stops to limit the movement of said fulcrums, each fulcrum being moved by the other pump and having a certain amount of free movement in respect of such pump crosshead, whereby the valve for each cylinder is opened by the other pump and closed by its own pump, and a separate cut-off valve working in combination with the valve for each cylinder.

2. A duplex pump, having in combination, a cylinder for each pump, a valve for each cylinder to control the admittance of an actuating fluid thereto, valve actuating levers operated by the crosshead of each pump, movable fulcrums supporting said levers, stops to limit the movement of said fulcrums, each fulcrum being moved by the other pump and having a certain amount of free movement in respect of such pump crosshead, whereby the valve for each cylinder is opened by the other pump and closed by its own pump, a separate cut-off valve working in combination with the valve for each cylinder, means to actuate said cut-off valve, and regulate said valve to vary the cut-off.

In testimony whereof I affix my signature in presence of two witnesses.

ARTHUR HUGHES TWELLS.

Witnesses:
 FRANK RUDDOCK,
 LYDIA MARY TWELLS.